United States Patent
Dowdy et al.

(10) Patent No.: US 7,310,172 B2
(45) Date of Patent: Dec. 18, 2007

(54) ADAPTER FOR VIEWING AND SCANNING IMAGES RESIDING ON TRANSPARENT MEDIA

(75) Inventors: Jacklyn M. Dowdy, Fort Collins, CO (US); Modest Khovaylo, Fort Collins, CO (US); Philipp Refior, Brooklyn, NY (US); Tony Aguilar, Hermosa Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 10/158,488

(22) Filed: May 30, 2002

(65) Prior Publication Data

US 2003/0231363 A1    Dec. 18, 2003

(51) Int. Cl.
*H04N 1/04*    (2006.01)
(52) U.S. Cl. .................. 358/487; 358/474; 358/497
(58) Field of Classification Search ................ 358/487, 358/506, 473, 472, 497, 494, 475, 474, 509, 358/505; D26/37; D16/225, 226, 227; 399/211, 399/212, 377–380; 348/96, 97; 250/234–236, 250/239, 216, 75; 355/75; 382/313, 312, 382/318, 319; 40/361–367
See application file for complete search history.

(56) References Cited

U.S. PATENT DOCUMENTS

| | | | | |
|---|---|---|---|---|
| 4,426,798 A * | 1/1984 | Saunders et al. | ............. | 40/361 |
| 5,430,964 A * | 7/1995 | Inbar et al. | ................... | 40/361 |
| 5,463,217 A | 10/1995 | Sobol | ......................... | 250/234 |
| 5,467,172 A | 11/1995 | Liao | ........................... | 355/231 |
| 5,652,665 A | 7/1997 | Chen | .......................... | 358/487 |
| 5,790,187 A * | 8/1998 | Suzuki | ....................... | 348/96 |
| 5,790,216 A * | 8/1998 | Inbar et al. | ................... | 349/83 |
| 5,838,464 A | 11/1998 | Fredlund et al. | ........... | 358/498 |
| 5,986,774 A | 11/1999 | Han | ............................. | 358/487 |
| 6,018,161 A | 1/2000 | Batten et al. | ............... | 250/234 |
| 6,163,385 A | 12/2000 | Kajander | ..................... | 358/475 |
| 6,177,982 B1* | 1/2001 | Snyder et al. | ............. | 358/487 |
| 6,279,253 B1* | 8/2001 | Inbar et al. | ................... | 40/361 |
| 6,292,596 B1 | 9/2001 | Snyder et al. | ............. | 382/319 |
| D476,764 S * | 7/2003 | Khovaylo et al. | ........... | D26/37 |
| D480,745 S * | 10/2003 | Aguilar et al. | ............. | D16/225 |
| 6,639,697 B1* | 10/2003 | Geer | ........................... | 358/487 |
| 6,678,075 B1* | 1/2004 | Tsai et al. | ................... | 358/487 |
| 6,819,457 B2* | 11/2004 | Sheng | ......................... | 358/487 |
| 6,850,344 B2* | 2/2005 | Chang | ......................... | 358/487 |
| 6,989,918 B2* | 1/2006 | Haas et al. | ................. | 358/487 |
| 7,110,150 B2* | 9/2006 | Tecu et al. | ................... | 358/487 |
| 7,119,934 B2* | 10/2006 | Yoshida et al. | ............. | 358/487 |

\* cited by examiner

*Primary Examiner*—Cheukfan Lee

(57) ABSTRACT

A transparency adapter includes a frame configured to removably receive and support a transparent media to be scanned, and a housing cooperating with the frame to position the frame at a comfortable viewing angle. A method of scanning an image residing on transparent media and a system for improving the scanning of transparencies on the platen of a reflective scanner are also disclosed.

19 Claims, 3 Drawing Sheets

ADAPTER FOR VIEWING AND SCANNING IMAGES RESIDING ON TRANSPARENT MEDIA

BACKGROUND OF THE INVENTION

1. Field of the Invention

The present invention relates generally to the field of optical scanners, and more particularly to an adapter for viewing and scanning transparent media.

2. Related Art

A document scanner converts a visible image such as a photograph, transparency, or printed paper into an electronic form suitable for copying, storing, or processing by a computer. Reflective document scanners typically have a controlled source of light which is reflected off of the surface of a document onto an array of photosensitive devices. The photosensitive devices convert received light intensity into an electronic signal. Transparency scanners pass light through a transparent image such as a photographic positive slide image, or perhaps a photographic negative, and then onto an array of photosensitive devices.

A transparent image may be scanned in a reflective scanner by placing a white surface behind the transparency, slide, negative or other transparent media. In such an arrangement light passes through the transparent media to a white background, reflects off the white background and passes through the transparent media a second time before impinging onto the photosensitive devices. As a result, light is filtered twice by the transparent image. In general, this double filtering creates an unacceptable distortion of gray scale, color, contrast, and other image characteristics of interest.

Reflective document scanners may also be adapted to scan transparent images by providing a separate light source to backlight the image so that the light passes through the transparent media only once. Such scanners, as well as reflective document scanners utilizing a white surface behind the transparent medium, typically employ a separate template, which is generally pre-positioned on the glass reflective image area or platen of the scanner to assist in the arrangement and alignment of the transparent media on the platen prior to scanning. Generally speaking, the process of arranging the transparent media, particularly slides and negatives, within the template on the platen is a time-consuming task. In addition, the scanner light is typically off during this process, thus viewing the slides and/or negatives while positioning them for scanning is impractical if not impossible.

As a general rule, the user may utilize a light source unrelated to the transparency adapter or scanner itself to view the slides and/or negatives prior to scanning to determine which, if any of the slides and/or negatives should be scanned and thereafter stored in memory. The selected slides and/or negatives may then be positioned within the template on the platen. A separate transparency adapter may then be positioned atop of the template and slides to facilitate scanning operations. This practice, however, requires additional equipment, which in turn increases the costs associated with scanning transparent media such as slides and negatives.

SUMMARY OF THE INVENTION

One aspect of the present invention is directed to a transparency adapter comprising a frame configured to removably receive and support transparent media to be scanned, and a housing cooperating with the frame to position the frame at a comfortable viewing angle.

In another aspect the present invention relates to a system for improving the scanning of transparencies on the platen of a reflective scanner. The transparency adapter comprises a frame configured to removably receive and support transparent media for viewing and a housing cooperating with the frame to position the frame at a comfortable viewing angle. A mounting template is constructed to mate with the housing to align the housing on the platen for scanning.

In yet another aspect the present invention is directed to a method of scanning an image residing on transparent media. The method comprises supporting the transparent media on a transparency adapter, and mating the transparency adapter with a template sized and shaped to receive the transparency adapter such that the transparent media supported on the transparency adapter is automatically aligned for scanning.

BRIEF DESCRIPTION OF THE DRAWINGS

The invention can be better understood with reference to the following drawing figures. The elements of the drawings are not necessarily to scale relative to each other, emphasis instead being placed upon clearly illustrating the principles and operation of the invention. Wherever possible, like reference numerals will be used throughout the drawing figures to refer to or designate the same or like parts throughout the several views.

DETAILED DESCRIPTION

A heretofore unaddressed need exists in the industry for a transparency adapter that supports the transparent media apart from the platen for viewing, selecting, and orienting desired images residing on the transparent media.

The present invention, in general, is directed to an adapter for use with optical scanners that facilitates the viewing, selection, orientation, and scanning of images that reside on transparent media such as, but not limited to, slides and photographic negatives. More specifically, and in accordance with the present invention, embodiments of the transparency adapter support and align a transparent media and provide backlighting for the transparent media when the transparency adapter is connected to, but not positioned on, the platen for scanning. Accordingly, in some embodiments, a single transparency adapter may serve a dual purpose. The preferred embodiment may serve as both a light box for viewing and selecting transparent images for scanning, and as an adapter for supporting and positioning the selected transparent images on the platen of an optical scanner to facilitate transparent image scanning, thus offering device versatility and ease of use.

While the adapter of the present invention is applicable for use with any number of optical scanners, and is capable of supporting and backlighting any type of transparent media for viewing and scanning, the invention will be described in detail below with reference to one implementation as a transparency adapter for use with flatbed reflective optical scanners. Moreover, while the images referred to below may reside on any transparent or any substantially transparent material, the preferred transparency adapter will be described with reference to images residing on slides and/or photographic negatives.

Figure 1:
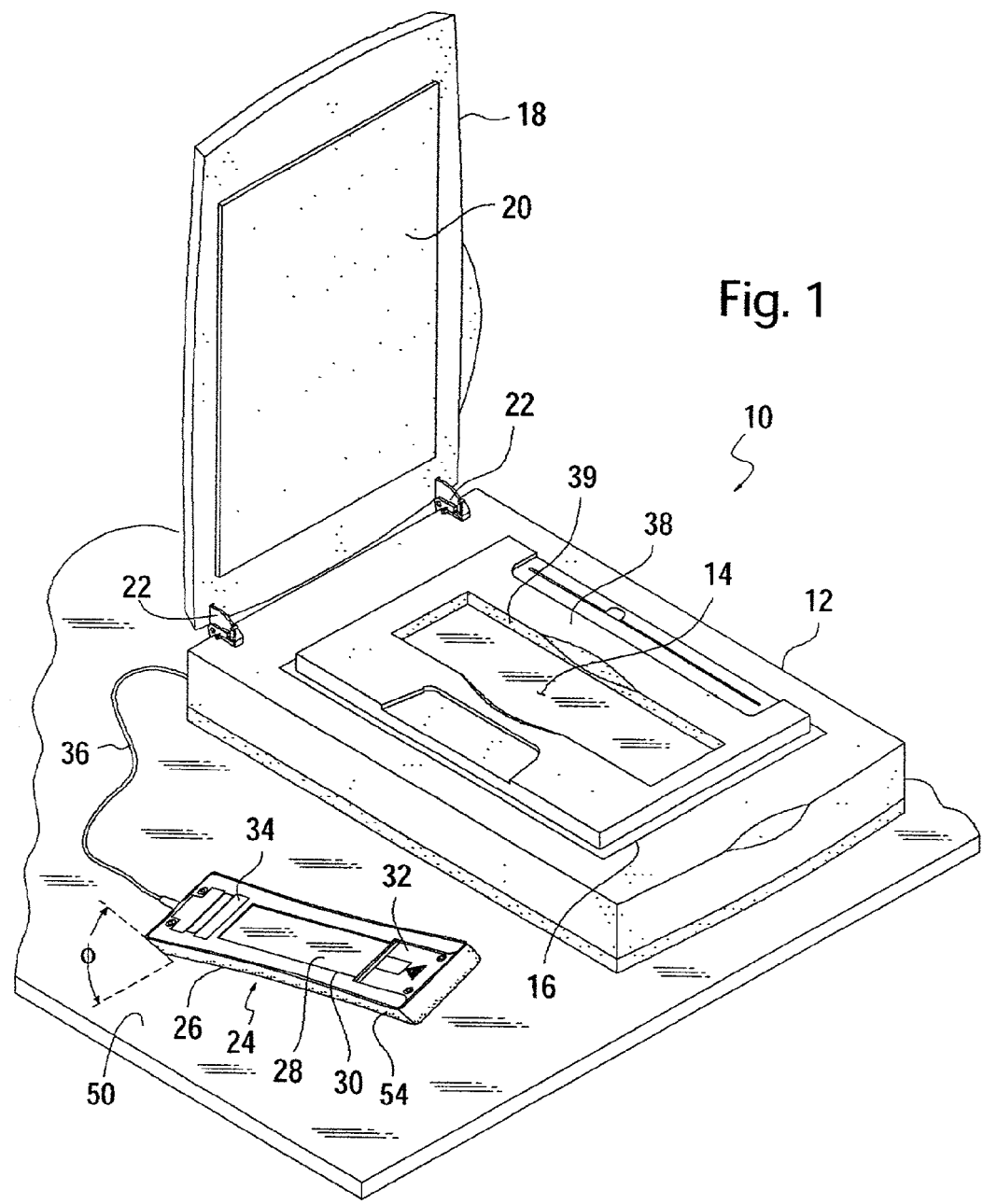
FIG. 1 is a perspective view of a preferred embodiment of the transparency adapter in accordance with the present invention.

Reference will now be made to the present preferred embodiments of the invention, an example of which is illustrated in the accompanying drawing figures. An exemplary optical scanner for use with the present invention is shown in FIG. 1, and is designated generally throughout by reference numeral 10. Reflective optical scanner 10 preferably includes a base portion 12 housing a source of light (not shown) and scanning electronics (not shown), and preferably defines a reflective image area or platen 14 having a platen boundary 16 for receiving media to be scanned. Generally speaking, when reflective optical scanner 10 is operated in the reflective mode, a non-transparent media, such as paper, is positioned on platen 14, preferably a transparent glass material, and a cover 18 is pivoted on one or more hinges 22 connecting the cover 18 to base portion 12 in the direction of platen 14, to cover the media to be scanned. So arranged, a reflective surface 20, preferably white in color, is positioned atop any portion of platen 14 not occupied by the media to be scanned in order to reflect any light passing through platen 14 back into reflective optical scanner 10.

An embodiment of a transparency adapter 24 is also depicted in FIG. 1. A preferred transparency adapter 24 is shown positioned at a comfortable viewing angle adjacent reflective optical scanner 1O in accordance with one aspect of the present invention. Transparency adapter 24 preferably comprises a housing 26 constructed and arranged to house transparency adapter electronics (not shown) and a source of light LS (schematically shown in FIG. 3), and preferably defines a viewing surface 28, preferably a clear plastic although a glass material may be used. As will be described in greater detail below, transparency adapter 24 preferably include a frame 30 constructed and arranged on housing 26 to receive and support a transparent media (FIG. 2) and position the media adjacent viewing surface 28. A recessed loading region 32 may be provided to facilitate the loading and unloading of the transparent media into frame 30. As one of skill in the art will appreciate, a calibration window 34 may also be provided on transparency adapter 24 to improve the transparent image scanning resolution and quality. A conduit 36 may preferably connect transparency adapter 24 to reflective optical scanner 10 and provide a communication pathway between transparency adapter 24 and reflective optical scanner 10.

In accordance with one aspect of the present invention, transparency adapter 24 serves a dual purpose. As shown in FIG. 1, transparency adapter 24 may be configured to function as a light box for viewing, screening, selecting, and arranging slides, photographic negatives, or other transparent media. In another aspect of the present invention, transparency adapter 24 may be configured to cooperate with a scanner to facilitate scanning of the images that reside on the selected slides or photographic negatives, as will be discussed in greater detail with reference to FIG. 4. When so configured, transparency adapter 24 may cooperate with a mounting template 38 that may generally be arranged and employed to provide for expeditious and accurate positioning of transparency adapter 24 on platen 14 for scanning.

Figure 2:
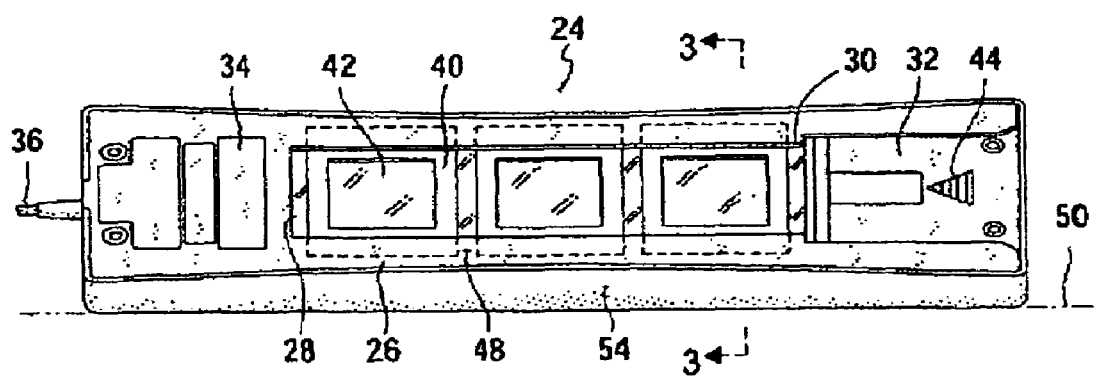
FIG. 2 is a front elevational view of the transparency adapter depicted in FIG. 1 shown supporting transparent slides in accordance with an embodiment of the present invention.
Figure 3:
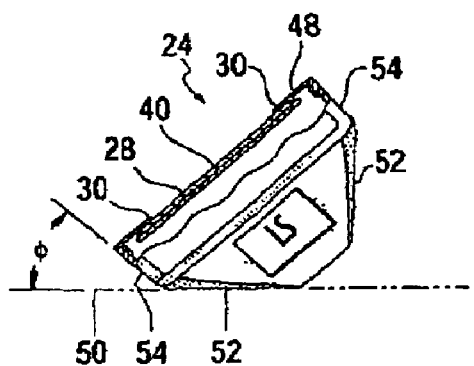
FIG. 3 is a cross-sectional view of an embodiment of a transparency adapter according to the present invention, taken along lines 3-3 of FIG. 2.

As shown in FIG. 1, mounting template 38 preferably includes an aperture 39 sized and shaped to receive transparency adapter 24 such that the face of transparency adapter 24 is directly adjacent platen 14. When configured as a light box as depicted in FIGS. 2 and 3, a portion of housing 26 may preferably form a three-sided frame 30 substantially bounding viewing surface 28. Frame 30 is preferably constructed and arranged to support a plurality of slides or a multiple frame negative strip adjacent viewing surface 28. In a preferred embodiment and as shown in FIG. 2, frame 30 is preferably sized to support up to three slides 40, each containing an image 42 thereon. If desired, frame 30 may instead support a negative strip.

When conduit 36 of transparency adapter 24 is properly connected to scanner 10 via a Universal Serial Bus (USB) port or serial port, and a light box mode or non-reflective mode for scanning is selected, viewing surface 28 may preferably be backlit so that slides 40 may be viewed by a user. Each slide 40 or other transparent media may preferably be positioned on recessed loading region 32 and thereafter sequentially urged in the direction of loading arrow 44 into the slot defined between frame 30 and the viewing surface 28. Frame 30 is preferably sized and arranged such that each slide 40 may be firmly held in position atop viewing surface 28. Light from the light source LS (schematically shown in FIG. 3) behind viewing surface 28 passes through slides 40 so that images 42 thereon may be easily viewed and examined by a user.

Another aspect of the present invention that facilitates viewing, screening, and selecting of images 42 is the construction and arrangement of housing 26. Housing 26 is preferably constructed and arranged such that face 48 of housing 26 may be presented to a user at an inclined angle Φ when housing 26 is resting on any substantially horizontal surface 50. Inclined angle Φ is referred to herein as a "comfortable viewing angle", and may be defined as an angle of between about zero degrees (0°) and ninety degrees (90°) when measured from horizontal surface 50. In preferred embodiments, "comfortable viewing angle" Φ may preferably be an angle between about thirty degrees (30°) and sixty degrees (60°) from horizontal surface 50. In a most preferred embodiment, "comfortable viewing angle" Φ may preferably be an angle of about forty-five degrees (45°) from horizontal surface 50. Those of skill in the art will recognize, however, that the angle at which face 48, and thus frame 30, of transparency adapter 24 is presented to a viewer will vary from the angles mentioned above when the surface upon which transparency adapter 24 rests is a surface other than a horizontal surface.

When transparency adapter 24 is positioned as described above, face 48, and thus images 42 on slides 40, is preferably optimally oriented such that a user can manipulate slides 40 and view images 42 on viewing surface 28 from a comfortable position. To achieve this orientation, transparency adapter 24 preferably includes a pair of slanted substantially planar surfaces 52, each of which is adapted to rest on horizontal surface 50 as shown in FIG. 3. Those of skill in the art will recognize that housing 26 may include only a single planar surface 52, and that the one or more planar surfaces 52 may be any size, shape and dimension that is capable of supporting the weight of transparency adapter 24. More specifically, planar surfaces 52 may be sized and shaped such that transparency adapter 24 does not rotate and thus tip over when transparency adapter 24 is supported on planar surface 52.

With transparency adapter 24 resting on planar surface 52, a user may repetitively insert and remove slides 40 from transparency adapter 24 in order to view images 42 while images 42 are substantially optimally oriented for viewing (when slides 40 are supported by frame 30 and transparency adapter 24 is supported on a planar surface 52) until the desired slides 40 are selected and arranged as desired for scanning. As a result, a user is less likely to become fatigued during the viewing and selecting process.

Figure 4:
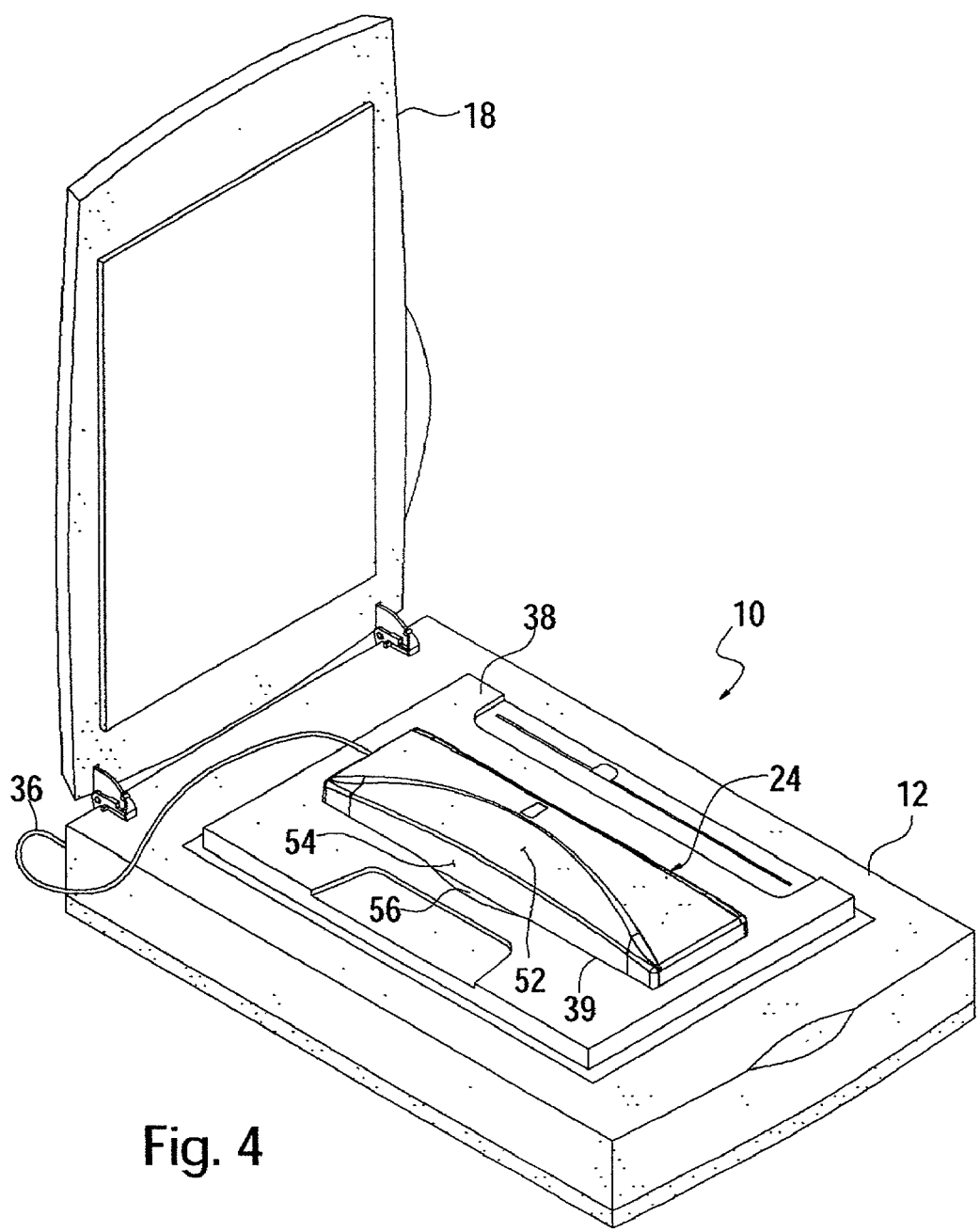
FIG. 4 is a perspective view illustrating the cooperation of the transparency adapter depicted in FIG. 2 and a preferred mounting template for scanning transparencies utilizing a reflective optical scanner in accordance with a preferred embodiment of the present invention.

Once slides 40 are arranged as desired, a user may grasp transparency adapter 24 with one hand and move transparency adapter 24 onto platen 14 to facilitate scanning of images 42 aligned within frame 30 of transparency adapter 24. Transparency adapter 24 is preferably received within aperture 39 of mounting template 38 to substantially cover platen 14. So arranged, transparency adapter 24, and thus slides 40 are preferably aligned on platen 14 for scanning as shown in FIG. 4. As shown in FIGS. 2 and 4, sides 54 of transparency adapter 24 may preferably be shaped to facilitate grasping of transparency adapter 24 by a user. Sides 54 are preferably curved to form concave surfaces which serve as handles for grasping transparency adapter 24. Concave sides 54 thus assist a user in moving transparency adapter 24 from a viewing position to a scanning position as shown in FIG. 4.

Referring again to FIG. 4, mounting template 38 may preferably be configured to facilitate insertion of transparency adapter 24 into aperture 39. More specifically, mounting template 38 may preferably include a pair of slanted recessed surfaces 56 adjacent aperture 39, which preferably correspond in location to the most narrow portion of face 48 of transparency adapter 24 when transparency adapter 24 is positioned within aperture 39. Slanted recessed surfaces 56, in cooperation with concave sides 54 of transparency adapter 24, thus provide room for a user's fingers to grasp sides 54 of transparency adapter 24 making it easier to insert and remove transparency adapter 24 from aperture 39.

When transparency adapter 24 is properly positioned within aperture 39 of template 38, viewing surface 28 will preferably remain backlit and reflective optical scanner 10 may scan images 42 positioned adjacent platen 14 in a non-reflective scanning mode. When scanning is complete, the user may simply grasp sides 54 of transparency adapter 24, preferably at or about the location of slanted recessed surfaces 56, and remove transparency adapter 24 from mounting template 38. Transparency adapter 24 may then be moved to a viewing position such as that shown in FIG. 1 and positioned on one of planar surfaces 52 so that the previously scanned slides 40 may be removed and/or replaced with additional slides 40. The newly selected slides may then be scanned as described above. This process may be repeated until all the desired slides 40 are scanned.

Although the preferred embodiment of the present invention has been described with reference to it being seated in a template 38, one skilled in the art will recognize that transparency adapter 24 could be configured to automatically align itself on platen 14 without the use of template 38. Moreover, while the preferred embodiment of transparency adapter 24 has been described as being capable of supporting up to three slides or a negative strip containing up to four frames, one of skill in the art will recognize that frame 30 could be sized to hold fewer or greater numbers of slides or negative strip frames. Once the appropriate images are selected and oriented on the transparency adapter, the adapter may simply be moved onto the platen so that the images may be scanned by the scanner. Such a device may preferably provide backlighting for the transparent media supported thereon, be configured to permit one-handed manipulation of the transparency adapter, be sized and shaped to present the supported images for viewing at a viewing angle that is comfortable to a viewer, and generally eliminate the steps of prepositioning and aligning the transparent media directly on the platen. Therefore, the above mentioned description is to be considered exemplary, rather than limiting.

Therefore, having this described the invention, at least the following is claimed:

1. A transparency adapter comprising:
   a frame configured to removably receive and support transparent media to be scanned; and
   a housing comprising a face and at least one planar surface arranged at an oblique angle with respect to the face, the housing cooperating with the frame to position the frame at a comfortable viewing angle; and
   a viewing surface positioned between the frame and of the housing, wherein the frame and the viewing surface cooperate to define a slot for slidably receiving the transparent media.

2. The transparency adapter of claim 1 wherein the frame is open at one of its ends.

3. The transparency adapter of claim 1 wherein the at least one planar surface comprises a first planar surface and a second planar surface, and wherein the face is disposed along a first plane, the first planar surface is disposed along a second plane and the second planar surface is disposed along a third plane, wherein the first plane, the second plane and the third plane each intersect each of the other planes.

4. The transparency adapter of claim 3 wherein the housing further comprises a pair of opposed curved slides one of the curved sides extending between the face and the first planar surface and the other of the pair of curved slides extending between the face and the second planar surface.

5. The transparency adapter of claim 1 wherein the housing comprises a pair of curved sides, each configured to form a concave gripping surface.

6. The transparency adapter of claim 1 wherein the comfortable viewing angle comprises an angle of between 30 degrees and 60 degrees when the transparency adapter is positioned on a substantially horizontal surface.

7. The transparency adapter of claim 1, wherein the adapter is configured to communicate with a scanner having a cover and wherein the adapter is configured to be moved relative to the cover while communicating with the scanner.

8. A system for improving scanning of transparencies on a platen of a reflective scanner, comprising:
   a transparency adapter comprising a frame configure to removably receive and support transparent media for viewing and a housing cooperating with the frame to position the frame at a comfortable viewing angle; and
   a mounting template constructed to mate with the housing to align the housing on the platen for scanning, wherein the mounting template defines an aperture sized and shaped to removably receive the transparency adapter.

9. The system of claimed 8 wherein the transparency adapter further comprises a viewing surface positioned between the frame and the housing.

10. The system of claim 9 wherein the frame and the viewing surface cooperate to define a slot for slidably receiving the transparent media.

11. The system of claim 8 wherein the frame is open at one of its ends.

12. The system of claimed 8 wherein the housing includes a face and at least one planar surface arranged at an angle with respect to the face.

13. The system of claimed 8 wherein the comfortable viewing angle is measured from a substantially horizontal surface and comprises an angle of about 45 degrees.

14. A method of scanning and image residing on transparent media, the method; comprising:
   supporting the transparent media on a transparency adapter;
   mating the transparency adapter with a template sized and shaped to receive the transparency adapter such that the transparent media supported on the transparency adapter is automatically aligned for scanning; and
   viewing and selecting the transparent media to be scanned prior to performing the mating step, wherein the transparency adapter comprises a viewing surface and at least one planar surface arranged at an angle with respect to the viewing surface and wherein the viewing step comprises positioning the transparency adapter on its at least one planar surface on a substantially horizontal surface to present the transparent media to a user at a comfortable viewing angle.

15. The method of claim 14 wherein the transparent media comprises a plurality of slides, the method further comprising arranging the plurality of slides on the transparency adapter as desired prior to mating the transparency adapter with the template.

16. A transparency adapter for use with a scanner having a cover, the adapter comprising:
   a transparent surface configured to support a transparent media; and
   a light source behind the transparent surface, wherein the adapter is configured to communicate with the scanner and wherein the adapter is configured to be moved relative to the cover while communicating with the scanner.

17. The transparency adapter of claim 16 further comprising a frame configured to removably receive and support transparent media.

18. A transparency adapter comprising:
   a frame configured to removably receive and support transparent media to be scanned; and
   a housing cooperating with the frame to position the frame at a comfortable viewing angle; and
   a viewing surface positioned between the frame and of the housing, wherein the frame and the viewing surface cooperate to define a slot for slidably receiving the transparent media.

19. The transparency adapter of claim 18, wherein the adapter is configured to communicate with a scanner having a cover and wherein the adapter is configured to be moved relative to the cover while communicating with the scanner.

* * * * *

UNITED STATES PATENT AND TRADEMARK OFFICE
CERTIFICATE OF CORRECTION

| | | |
|---|---|---|
| PATENT NO. | : 7,310,172 B2 | Page 1 of 1 |
| APPLICATION NO. | : 10/158488 | |
| DATED | : December 18, 2007 | |
| INVENTOR(S) | : Jacklyn M. Dowdy | |

It is certified that error appears in the above-identified patent and that said Letters Patent is hereby corrected as shown below:

In column 3, line 39, delete "1O" and insert -- 10 --, therefor.

In column 6, line 35, in Claim 4, delete "slides" and insert -- sides --, therefor.

In column 6, line 37, in Claim 4, delete "slides" and insert -- sides --, therefor.

In column 7, line 8, in Claim 14, after "method" delete ";".

Signed and Sealed this

Twenty-fourth Day of June, 2008

JON W. DUDAS
*Director of the United States Patent and Trademark Office*